Patented Sept. 11, 1945

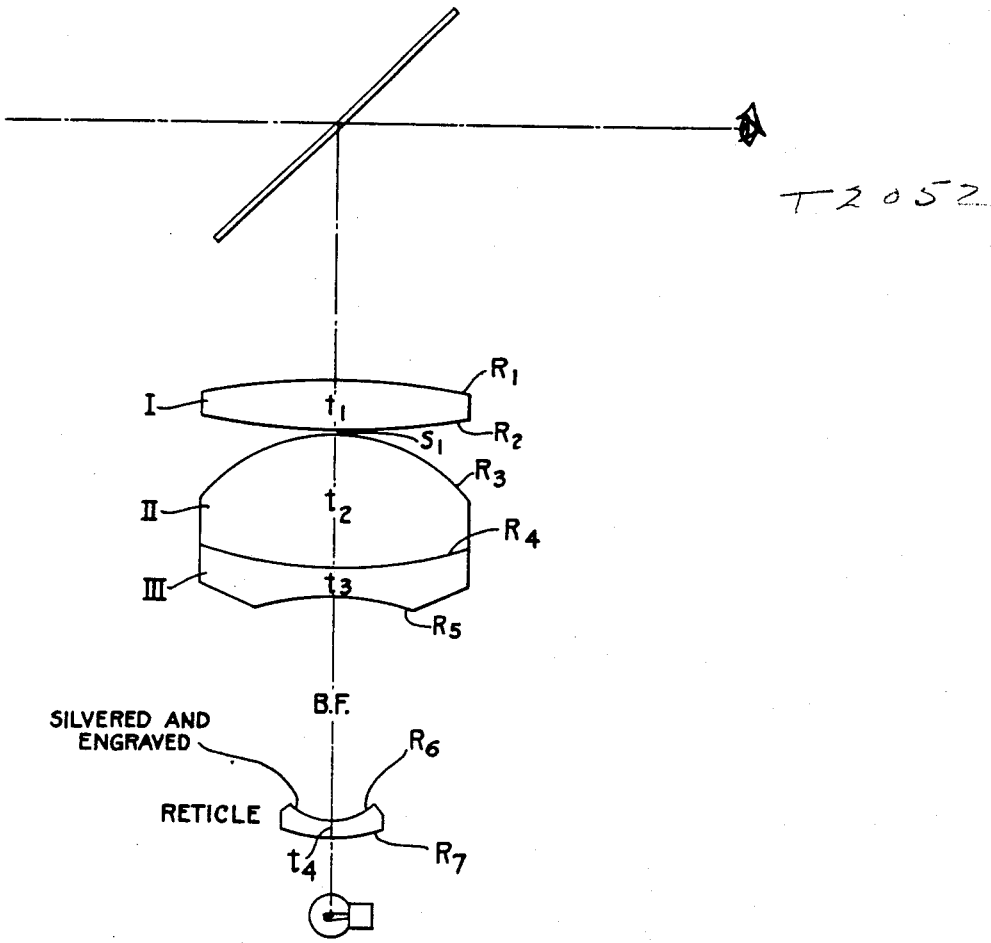

2,384,643

UNITED STATES PATENT OFFICE 2,384,643

OBJECTIVE FOR REFLEX SIGHT

Willy Schade, Rochester, N. Y., assignor to Eastman Kodak Company, Rochester, N. Y., a corporation of New Jersey Application March 1, 1944, Serial No. 524,590

2 Claims. (Cl. 88—57)

This invention relates to collimator lenses such as for reflex sights.

An object of the invention is to provide a lens which is corrected for chromatic aberrations and coma and extremely well corrected for spherical aberration including zonal spherical aberration and which is very suitable for use at high apertures; i. e., about f/2.4 to about f/1.2 or even higher.

Previous lenses for this purpose have usually been simple doublets in which the bad zonal spherical aberration had to be tolerated, or have been more complicated systems such as two doublets or three components, and have suffered from coma and chromatic aberration.

According to the present invention, all these objections are overcome by an objective consisting of a biconcave element cemented to a lower index biconvex element and a second biconvex element coaxially spaced close to and in front of the latter. The convention is here used of regarding the front of the lens as that side facing the more distant conjugate. If the lens is used in a reflex sight the eye will accordingly be situated in front of the lens and a reticle will be at the rear principal focus. A curved reticle may be used in accordance with my copending application, Serial No. 511,964, filed November 27, 1943, "High aperture collimator objectives."

The spacing between the two components should be less than 0.4 times the focal length of the objective.

There are several preferred features which are of advantage when used singly and which cooperate to produce a very superior reflex sight objective if used together.

First, the difference in refractive index between the two cemented elements should be greater than 0.06 and preferably greater than 0.12. This feature is of especial value in reducing the zonal spherical aberration.

Second, the dispersive index of one and preferably both biconvex elements should be greater than 1.6 times that of the biconcave element in order to correct the chromatic aberration.

Third, the second mentioned biconvex element; i. e., the single uncemented element, should in the preferred embodiment be somewhat near equi-convex and with neither radius of curvature greater than three times that of the other. Preferably the front surface has the shorter radius of curvature.

Fourth, the dioptric power should be somewhat evenly distributed between the two components, so that the focal length of the front component is between .3 and 1.0 times that of the doublet.

The accompanying drawing shows a lens which combines all these features and is very excellently corrected for an aperture of f/1.6. Its specifications are repeated here:

EF=100 mm.                                                  f/1.6

| Lens | $N_D$ | V | Radii | Thickness |
|---|---|---|---|---|
| I | 1.517 | 64.5 | $R_1=+178.7$ | $t_1=11.8$ |
|   |       |      | $R_2=-204.5$ | $s_1=1.0$ |
| II | 1.517 | 64.5 | $R_3=+42.5$ | $t_2=33.3$ |
| III | 1.720 | 29.3 | $R_4=-95.0$ | $t_3=5.3$ |
|    |       |      | $R_5=+66.4$ | B.F.=54.6 |

The index difference at the cemented surface is 0.203, and both positive elements have a dispersive index 2.2 times that of the negative element. The single positive element is nearly equiconvex, the front surface having a radius of curvature about 0.9 times that of the other surface. The focal lengths of the two components are roughly equal, that of the cemented component being 333-mm. and that of the single element being 186.4-mm. The ratio is thus .56.

The reticle is engraved on a field lens having the following specifications:

Silvered and engraved surface __ $R_6=-14.9$ mm.
Thickness _____ $t_4=$ 4.0 mm.
Rear surface _____ $R_7=-37.0$ mm.

The glass is ordinary white optical crown $N_D=1.523$, V=58.4.

What I claim is:

1. An objective having a relative aperture between f/2.4 and f/1.2 consisting of two coaxial components of which the rear component consists of a biconcave element cemented to the rear of a biconvex element of lower index and the front component consists of a single biconvex element, the two components being spaced apart by less than 0.4 F where F is the focal length of the objective, and in which the refractive indices of the two elements of the rear component differ by more than 0.06, the dispersive index of each of the two biconvex elements is greater than 1.6 times that of the biconvex element, the front surface of the front component has a radius of curvature shorter than that of the rear surface of the same component and greater than ⅓ thereof and the focal length of the front component is between 0.3 and 1.0 times that of the rear component.

2. An objective having a relative aperture between f/2.4 and f/1.2 and having approximately the following characteristics:

| Lens | $N_D$ | V | Radii | Thickness |
|---|---|---|---|---|
| I | 1.5 | 65 | $R_1=+2F$<br>$R_2=-2F$ | $t_1=.1F$<br>$s_1=.01F$ |
| II | 1.5 | 65 | $R_3=+.4F$<br>$R_4=-F$ | $t_2=.3F$<br>$t_3=.05F$ |
| III | 1.7 | 30 | $R_5=+.7F$ | | where the lens elements are listed in order from the long conjugate side, $N_D$ is the index of refraction for the D line, V is the dispersive index, the radii of curvature are numbered from the long conjugate side, + and − signs respectively indicating surfaces convex and concave to the front, the thicknesses $t$ of the elements are numbered from the long conjugate side, $s_1$ is the axial separation of the two components and F is the focal length of the objective.

WILLY SCHADE.